Patented May 1, 1928.

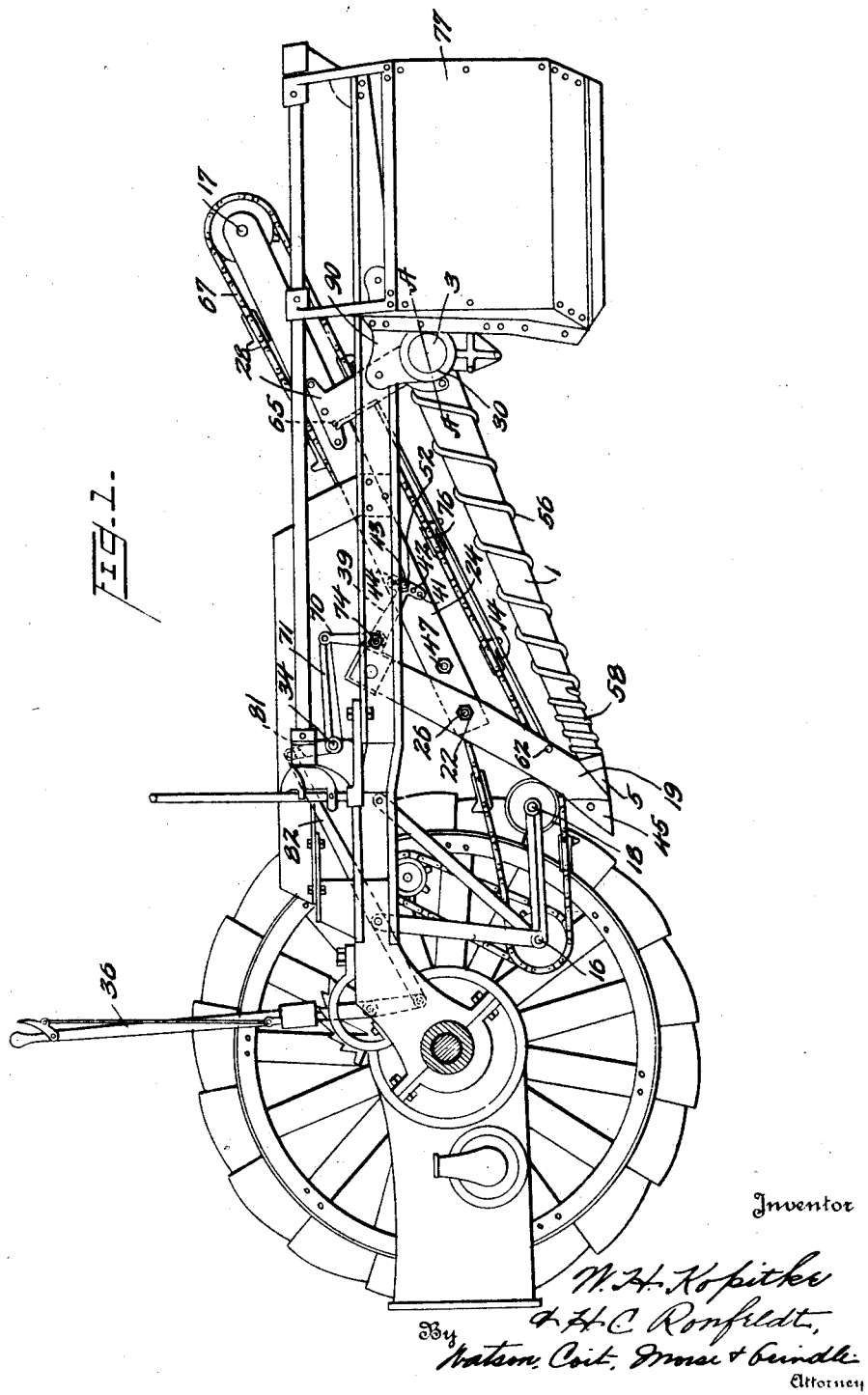

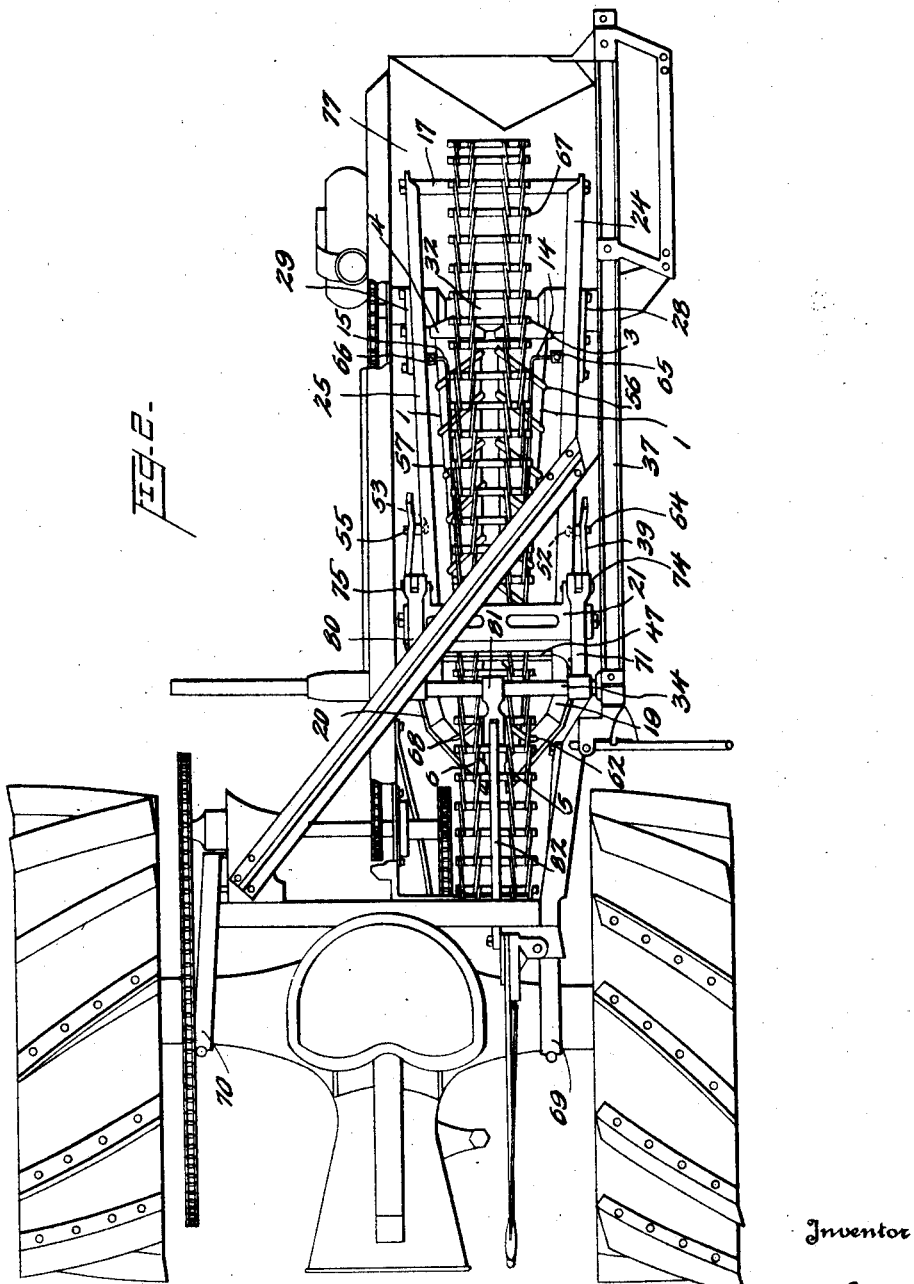

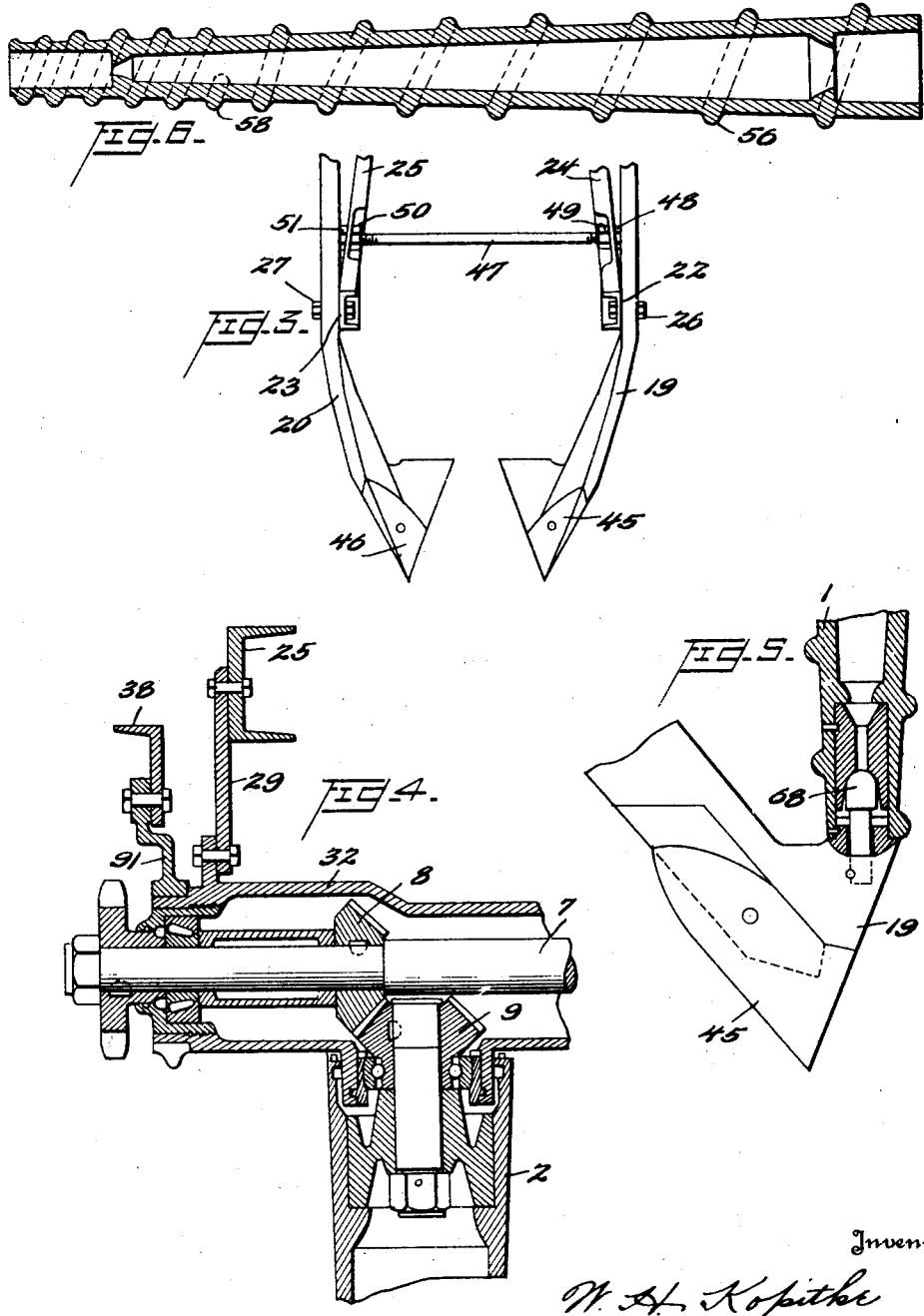

1,668,157

UNITED STATES PATENT OFFICE.

WILLIAM H. KOPITKE AND HENRY C. RONFELDT, OF TOLEDO, OHIO, ASSIGNORS, BY MESNE ASSIGNMENTS, TO THE FANGER BEET HARVESTER COMPANY, A CORPORATION OF OHIO.

BEET HARVESTER.

Application filed December 31, 1923. Serial No. 683,795.

The present invention is illustrated by beet harvesting machines of a type which have two revolving augers, mounted on digger arms, the lower ends of which extend beneath the surface of the ground, but is not limited to such an arrangement. In our co-pending applications Serial Number 425,321, filed November 20th, 1920, Serial Number 530,125, filed January 18th, 1922, and Serial Number 614,383, filed January 23rd, 1923, such a digging arrangement is shown and described in connection with a topping element which tops the beets before they are dug.

Our invention has for its object to cure the defects in prior types of augers and to provide simple and efficient means for lifting, cleaning and conveying beets.

The further object of our invention is to provide a pair of augers for lifting beets that will allow the distance between the front ends thereof to be narrowed as necessary and still maintain a suitable working distance between the augers from front to rear.

The further object of our invention is to provide means for digging beets that will lift them without breaking or bruising them and that will clean them without breaking, bruising or smearing them.

The further object of our invention is to provide in connection with open spaces at the sides of the augers to dispose of the dirt raised with the beets, suitable means to retain the beets between the augers.

The further object of our invention is to provide threads on the augers that will be most efficient in digging beets.

The further object of our invention is to provide augers to dig and convey beets that will allow the beets to ride evenly over the full length of the augers.

The invention also has the object of regulating the distance between the end bearings of the augers so that they can be kept in snug condition without end-pressure.

The invention has for its objects other features and advantages which will appear from the following description and upon examination of the drawings.

The invention may be contained in structures of different forms. To illustrate a practical application of the invention, we have selected the structure containing the invention, as an example of the different structures that embody the invention, and shall hereinafter describe the one selected. The structure referred to is illustrated in the accompanying drawings.

Figure 1 of the drawings is a side view of the augers and digging and conveying mechanism, mounted in a sub-frame and attached to a suitable tractor, the left wheel of the tractor being removed.

Figure 2 is a top view of the same, omitting the topping element located at the right side of the digging element.

Figure 3 is a front view of the lower ends of the digger arms and the augers, showing the cross bolt for adjusting the distance between them.

Figure 4 is a cross section on the line AA of the upper end of the inside auger, showing the power mechanism for driving the augers.

Figure 5 is a cross section of the bearing at the lower end of one of the augers.

Figure 6 is a sectional view of one of the augers.

The digging element is mounted in a sub-frame having side members 24 and 25. The sub-frame in turn is mounted on a main frame with side members 37 and 38 pivotally attached to the rear axle housing of a suitable tractor at 69 and 70.

The augers 1 and 2 are mounted with their upper ends in bearings 3 and 4 and with their lower ends in bearings 5 and 6.

Bearings 5 and 6 are ball and socket bearings, the balls 68 and 69 extending from digger arms 19 and 20, respectively, into the small ends of the augers 1 and 2, respectively. The digger arms 19 and 20 are attached at their upper ends to cross member 21. They are pivoted at a point intermediate to their ends at 22 and 23 to sub-frame members 24 and 25 by bolts 26 and 27 respectively and are braced rearwardly by members 39 and 40 pivotally fastened to them and adjustably connected to side members 24 and 25, respectively. Sub-frame members 24 and 25 are fastened at their rearward ends to brackets 28 and 29, which are fastened at 30 and 31, respectively, on the member 32 which supports the upper ends of the augers 1 and 2, and which is itself pivotally supported by the main frame members 37 and 38 by brackets 90 and 91.

The front end of the sub-frame is raised and lowered by links 70 and 71 and arms 79 and 80, which are moved around the shaft 34 through member 81 and link 82 by lever 36 attached to the main frame member 37. The upper ends of digger arms 19 and 20 and the lower end of the sub-frame 24 and 25 are held fixed against lateral movement by members 37 and 38 of the main frame between which the upper assembly of digger arms 19 and 20 slide when the sub-frame is raised and lowered.

The side members of the sub-frame 24 and 25 are laterally spaced by tie-rod 47, which holds digger arms 19 and 20 in fixed lateral relation. Tie-rod 47 is threaded for a considerable distance at each end. Nuts 48 and 49 are located on the tie-rod 47, one on each side of side member 24. Nuts 50 and 51 are located on the tie-rod 47, one on each side of the side member 25. As these nuts are moved with relation to the ends of tie-rod 47, they may be locked in place against the side members 24 and 25. As the nuts and side members are moved toward the ends of tie-rod 47, the digger arms 19 and 20, and consequently the digger points 45 and 46 and the lower ends of the augers 1 and 2 are separated from one another. As these nuts or side members are moved toward the center of the tie-rod 47, the reverse takes place.

It has been found in prior auger arrangements that any attempt to space the digger arms by connections directly between the same above the digger points, results in the clogging of the space between them and of the belt mechanism at that point, by the large quantity of dirt that is raised. By effecting the adjustment at a point beyond that where the dirt has an opportunity to work out, as in the invention illustrated, this difficulty is obviated.

Brace members 39 and 40 are pivoted at their forward ends at 74 and 75 respectively. Their rear ends are widened where they connect with side members 24 and 25, and holes 41 to 44 and 41' to 44' respectively are drilled across the rear ends of the members at different distances from points 74 and 75, respectively. Bolts 52 and 53 are respectively inserted through holes in side members 24 and 25 and also through one of said holes selected respectively in 39 and 40. As the attachments of members 39 and 40 are varied at their rearward ends, digger arms 19 and 20 may be drawn respectively against the lower ends of augers 1 and 2 and held snugly in their bearings. That hole is selected for bolts 52 and 53 in the rear end of members 39 and 40 to secure the proper adjustment. These bolts are then locked in place by nuts 54 and 55. In this way the augers are held by adjustable means without subjecting them to an end pressure which experience has shown will quickly wear out their bearings.

The augers are power driven by chain and sprocket through the shaft 7. The inside or right auger is driven by bevelled gears 8 and 9, as shown in Figure 4. The other auger is driven similarly by the opposite end of shaft 7. These augers have right and left threads 56 and 57 respectively. Auger 1 revolves from right to left and the auger 2 from left to right, so that the augers hold the beet upright between them and stroke it upward from either side as the threads carry it up and back into the hopper 77 disposed to the rear of the augers. While the beet rides between the augers, it is kept from jumping from one side to the other by rods 14 and 15, and is kept from jumping out on top by the belt or web 67, which is mounted on shafts 16 and 17 and power driven by chain and sprocket. This belt or web runs lengthwise over the space between the augers, its lower reach travelling up and back over the augers. The belt or web 67 is held taut slightly above the augers by the idler 18.

Augers 1 and 2 are replicas of each other except that the threads thereon run in opposite directions. The type of auger used is smaller at the front end and has a straight tapered cone-shaped body with a narrow but well-rounded, raised thread thereon, so that the space between the augers is at all times represented, except for the narrow ridge of the threads, by two straight lines which are respectively the main portions of the augers. There is with these improvements a minimum contact between the augers and the beets and this prevents the beets from being bruised by the threads or from being smeared with mud by them when the ground is wet.

While the digging and conveying of beets by augers is not new, it was not until the invention of the improvements described herein that a satisfactory result was obtained. The ordinary gimlet type thread bruises the beets, and the pointing of the auger near the front end tends to spread the distance between the front ends of the augers too far to engage all sizes of beets. Means to adjust the distance between the front ends of the augers was not sufficient to cure this defect because the closing the front ends, too nearly closed the space between the middle portions of the augers. Any rapid narrowing of the space between the augers moreover, causes the beets to jump out from between them. This is true even in the intervals between the threads. The problems of digging beets by augers were not, therefore, solved without providing as uniform a space as possible between the whole length of the augers and reducing the root of the threads extending therein to the minimum. Experience has shown this construction more efficiently lifts and conveys beets of all sizes and does it without throwing them out, breaking, bruising or smearing them.

The threads 56 and 57 respectively run from end to end of the augers. Each auger has in addition at its lower end, another thread 58 and 59 respectively spaced inside the first thread and running only part way up the augers, so that each auger has a double lead at its lower or smaller end and begins lifting the beet the moment contact is made with it in the ground, greatly reducing the chance of breaking the beet off while it is being dug.

The augers revolve outwardly and throw the dirt that rises with the beets out to the sides. To prevent the beets from following the dirt over the augers, rods 14 and 15 are positioned over the augers on each side of the sub-frame, the lower ends thereof being fastened in the digger arms 19 and 20 at 62 and 63, respectively, and the upper ends thereof being fastened in the side members of the sub-frame 24 and 25 at 65 and 66, respectively. These rods are slightly above the augers and a little to each side of the space between them so that the beets as they ride up the augers and are being cleaned of dirt are kept from jumping out of the open space at the sides between the augers and the belt or web over them. The belt or web 67 is equipped with teeth as at 76 to aid in carrying the beets up the augers.

The beets are raised by digger points 45 and 46 fastened on digger arms 19 and 20, assisted by augers 1 and 2 and threads 56 to 59. They are then conveyed back and up the augers by these threads assisted by the web 67 into the hopper 77 from which they are dumped in windrows. As the beets ride up the augers, the dirt dug with them is separated from them in large quantities and works through the open spaces at the sides between the augers and the web.

Having thus described our invention, that which we claim as new and desire to secure by Letters Patent is,

1. In a mechanism for removing beets from the ground, a frame having side members, two digger arms connected to said side members and extending downward, a pair of revolving augers supported by the lower ends of said digger arms and extending rearwardly therefrom, and means to vary the distance between the side members of said frame to regulate the distance between the front ends of said augers.

2. A mechanism for removing beets from the ground, comprising two tapered augers mounted side by side, their smaller ends extending forward and diagonally down and entering the ground, a moving belt coacting with said augers to convey beets along said augers, and means above the lower reach of said belt and to the rear of said ends, for varying the distance between the front ends of said augers.

3. In a beet digging mechanism, a pair of digger arms, a pair of guards fastened thereto, and means intermediate the ends of said guards for varying the width respectively between said digger arms and said guards.

4. In a beet digger, a pair of digger arms, a pair of revolving augers mounted thereon and a pair of guards fastened thereto, and means intermediate the ends of said guards for varying the width respectively between said augers and said guards.

5. In a beet harvester, a pair of augers for conveying beets upwardly and rearwardly comprising elongated cone shaped bodies having straight sides, a narrow well rounded raised thread thereon, a second thread spaced inside the first thread at the lower and smaller end of the auger forming a double thread running only part way up the auger, the double thread serving to lift the beets out of the ground, and the single thread serving to convey the beets.

6. In a beet harvester, in combination, a frame, a pair of digger arms carried by said frame, a pair of augers journaled in said digger arms, an endless belt mounted in said frame above the augers, and a rod carried by said digger arms and said frame at each side of the augers between the augers and the belt, said rod retaining the beets but permitting the free escape of dirt.

7. In a beet harvester, a vehicle frame, a subframe pivoted thereto, comprising side members and a pair of digger arms, a pair of inclined augers journaled on said digger arms, an endless belt mounted between said side members above said augers, means for adjusting said subframe about its pivot, and means for adjusting said digger arms with respect to said side members.

8. In a beet harvester, a vehicle frame, a subframe comprising side members pivoted thereto, a pair of digger arms carried by said side members, a pair of inclined augers journaled in said digger arms, an endless belt mounted above said augers and cooperating therewith to convey beets upwardly and rearwardly, rods secured to each digger arm between the augers and the belt, and means for adjusting the distance between the front ends of the side members, whereby the digger arms, augers and rods will be adjusted laterally and maintain their vertical relations.

9. In a beet harvester, in combination, a main vehicle frame, a subframe pivoted thereto comprising side members, a pair of digger arms carried by said side members and having fixed digger points, a pair of augers journaled in said digger arms and mounted on the pivot of said subframe, means for adjusting the lateral distance between the front ends of said side members, whereby said digger points and augers are adjusted, a belt mounted between said side members above the augers, means for retaining beets between said augers and belt permitting free escape of dirt, and means for adjusting said subframe and augers about the pivot of the subframe.

10. In a mechanism for removing beets from the ground, a frame, revolving augers mounted therein for conveying the beets upwardly and rearwardly, bars secured above the augers in parallel relation to the axis of said augers to prevent the beets from working over the augers, means above and near the front ends of said augers for varying the distance between said augers, whereby the bars may maintain their parallel relation with respect to said augers.

11. In a beet digger, a frame, a pair of digger arms pivoted therein, augers supported by bearings at their lower ends, bearings for their upper ends supported by the frame, and means for regulating the distance between the end bearings of each auger so that they can be kept in snug condition without end pressure, comprising an element adapted to be selectively positioned in any one of a series of separate spaced holes.

In testimony whereof, we have hereunto signed our names to this specification.

WILLIAM H. KOPITKE.
HENRY C. RONFELDT.